United States Patent
Ozawa

(10) Patent No.: US 7,139,443 B2
(45) Date of Patent: Nov. 21, 2006

(54) SIGNAL PROCESSING METHOD FOR PRODUCING INTERPOLATED SIGNAL VALUES IN A SAMPLED SIGNAL

(76) Inventor: Naoki Ozawa, Tsutsujigaoka 2-4-16-602, Akishima, Tokyo (JP) 196-0012

( * ) Notice: Subject to any disclaimer, the term of this patent is extended or adjusted under 35 U.S.C. 154(b) by 904 days.

(21) Appl. No.: 10/202,658

(22) Filed: Jul. 22, 2002

(65) Prior Publication Data
US 2003/0231807 A1    Dec. 18, 2003

(51) Int. Cl.
*G06K 9/32*    (2006.01)
(52) U.S. Cl. ........................ 382/300; 382/250
(58) Field of Classification Search ............... 382/250, 382/298–300, 165, 324; 358/451, 539; 348/242, 348/272, 273; 375/240.18–240.2
See application file for complete search history.

(56) References Cited

U.S. PATENT DOCUMENTS 4,630,307 A    12/1986    Cok
4,642,678 A    2/1987    Cok
5,168,375 A *  12/1992   Reisch et al. ............... 382/250
6,154,493 A    11/2000   Acharya et al.

FOREIGN PATENT DOCUMENTS

| JP | 9-84031   | 3/1997 |
| JP | 10-108209 | 4/1998 |
| JP | 11-261807 | 9/1999 |

* cited by examiner

*Primary Examiner*—Ishrat Sherali

(57) ABSTRACT

A method for producing interpolated signal values between sampled signal values in a sampled image signal produced by a checkerboard sampling pattern is accomplished by extracting a block of 2N-by-2N signal values that correspond to a block of sampling locations of the checkerboard sampling pattern, providing a set of frequency coefficients by a discrete cosine transform with the block of 2N-by-2N signal values, and providing at least a interpolated signal value that corresponds to the interpolation location by an inverse discrete cosine transform with the set of frequency coefficients. Here, a block of 2N-by-2N signal values is extracted so that sampled signal values exist in all the pixel locations of the block.

8 Claims, 9 Drawing Sheets

$$F(u,v) = \frac{2}{N} \cdot \sum_{i=0}^{N-1} \sum_{j=0}^{N-1} c(u) \cdot c(v) \cdot x(i,j)$$
$$\cdot \cos\left(\frac{(2i+1)u\pi}{2N}\right) \cdot \cos\left(\frac{(2j+1)v\pi}{2N}\right), \quad (1)$$

$$c(u), c(v) = \frac{1}{\sqrt{2}} \quad \text{if} \quad u,v = 0$$
$$\qquad\qquad 1 \quad \text{if} \quad u,v \neq 0 \;.$$

FIG. 10

$$x(i,j) = \frac{2}{N} \cdot \sum_{u=0}^{N-1} \sum_{v=0}^{N-1} c(u) \cdot c(v) \cdot F(u,v)$$
$$\cdot \cos\left(\frac{(2i+1)u\pi}{2N}\right) \cdot \cos\left(\frac{(2j+1)v\pi}{2N}\right), \quad (2)$$

$$c(u), c(v) = \frac{1}{\sqrt{2}} \quad \text{if} \quad u,v = 0$$
$$\qquad\qquad 1 \quad \text{if} \quad u,v \neq 0 \;.$$

FIG. 11

$$x'(i',j') = \frac{2}{N} \cdot \sum_{u=0}^{N-1} \sum_{v=0}^{N-1} c(u) \cdot c(v) \cdot F(u,v)$$
$$\cdot \cos\left(\frac{(i'+1)u\pi}{2N}\right) \cdot \cos\left(\frac{(j'+1)v\pi}{2N}\right), \quad (3)$$

$$c(u), c(v) = \frac{1}{\sqrt{2}} \quad \text{if} \quad u,v = 0$$
$$\qquad\qquad 1 \quad \text{if} \quad u,v \neq 0 \;.$$

FIG. 12

$$Fa(u',v') = \frac{2}{N} \cdot \sum_{i=0}^{N-1} \sum_{j=0}^{N-1} c(u') \cdot c(v') \cdot Ga[k][h]$$
$$\cdot \cos\left(\frac{(2h+1)u'\pi}{2N}\right) \cdot \cos\left(\frac{(2k+1)v'\pi}{2N}\right) , \quad (4)$$

$$c(u'), c(v') = \frac{1}{\sqrt{2}} \quad \text{if} \quad u',v' = 0$$
$$\qquad\qquad\quad 1 \quad \text{if} \quad u',v' \neq 0 .$$

FIG. 13

$$Ga[k][h] = \frac{2}{N} \cdot \sum_{u'=0}^{N-1} \sum_{v'=0}^{N-1} c(u') \cdot c(v') \cdot Fa(u', v')$$
$$\cdot \cos\left(\frac{(2h+1)u'\pi}{2N}\right) \cdot \cos\left(\frac{(2k+1)v'\pi}{2N}\right) , \quad (5)$$

$$c(u'), c(v') = \frac{1}{\sqrt{2}} \quad \text{if} \quad u',v' = 0$$
$$\qquad\qquad\quad 1 \quad \text{if} \quad u',v' \neq 0 .$$

FIG. 14

$$Ga'[k'][h'] = \frac{2}{N} \cdot \sum_{u'=0}^{N-1} \sum_{v'=0}^{N-1} c(u') \cdot c(v') \cdot Fa(u', v')$$
$$\cdot \cos\left(\frac{(h'+1)u'\pi}{2N}\right) \cdot \cos\left(\frac{(k'+1)v'\pi}{2N}\right) , \quad (6)$$

$$c(u'), c(v') = \frac{1}{\sqrt{2}} \quad \text{if} \quad u',v' = 0$$
$$\qquad\qquad\quad 1 \quad \text{if} \quad u',v' \neq 0 .$$

FIG. 15

$$Ga'[7][7] = \frac{2}{N} \cdot \sum_{u'=0}^{\frac{N}{2}-1} \sum_{v'=0}^{\frac{N}{2}-1} c(2u') \cdot c(2v') \cdot Fa(2u', 2v')$$

$$\cdot \cos\left(\frac{(7+1)u'\pi}{N}\right) \cdot \cos\left(\frac{(7+1)v'\pi}{N}\right)$$

$$= \frac{1}{4} \cdot \sum_{u'=0}^{3} \sum_{v'=0}^{3} c(2u') \cdot c(2v') \cdot Fa(2u', 2v') \cdot (-1)^{u'+v'} \quad , \qquad (7)$$

$$c(2u'), c(2v') = \frac{1}{\sqrt{2}} \quad \text{if} \quad 2u', 2v' = 0$$

$$\phantom{c(2u'), c(2v') =} 1 \quad \text{if} \quad 2u', 2v' \neq 0 \quad .$$

FIG. 16

$$Ga'[7][7] = \sum_{k=0}^{7} \sum_{h=0}^{7} \text{coef}(k,h) \cdot Ga[k][h] \quad . \qquad (8)$$

FIG. 17

SIGNAL PROCESSING METHOD FOR PRODUCING INTERPOLATED SIGNAL VALUES IN A SAMPLED SIGNAL

CROSS-REFERENCE TO RELATED APPLICATION

Not Applicable

BACKGROUND OF THE INVENTION

1. Field of the Invention

The invention relates to a signal processing method for providing interpolated values between the sample values in a sampled image signal. More specifically, the invention relates to such signal processing methods for providing interpolated values between sample values of checkerboard sampling pattern.

2. Description of the Related Art

A single-chip color image sensor is employed in numerous image capturing apparatuses including digital still cameras to reduce the size and cost of the apparatus.

In the imaging plane of a single-chip color image sensor, pixels including image sensing element are arranged to two-dimension. Being overlaid with a color filter array, the pixels of the single-chip color image sensor alternate between pixels for sampling luminance component (e.g. green) and pixels for sampling one and then the other of the chrominance components (e.g. red and blue). When reconstructing an image from the sampled color image signals produced by the single-chip color image sensor, values of the luminance component and chrominance components are provided for each sample location. This is generally accomplished by some signal processing method involving linear interpolation. From the characteristic that human visual system has big sensitivity to a luminance component, it is known that the resolution of a reproduced picture relates to the resolution of a luminance component. Consequently, the resolution of a reproduced picture is greatly concerned with the way of generating interpolated luminance component.

In many digital still cameras, a single-chip color image sensor employs well known filter array pattern, the checkerboard pattern described in U.S. Pat. No. 3,971,065 issued Jul. 20, 1976 to B. E. Bayer. The checkerboard pattern is often called a Bayer array.

FIG. 1 shows the color sampling pattern of the Bayer array. The luminance sampling elements, labeled G, are separated by chrominance sampling elements, labeled R or B. In the Bayer array, luminance sampling elements, labeled G, occur at every other sampling location to provide a relatively high frequency sampling pattern which is uniform in horizontal and vertical directions. Chrominance sampling elements, labeled R or B, is surrounded by four immediately adjacent luminance sampling elements. In FIG. 1, the number in the upper part of the array expresses row number, and the number in the left side of the array expresses column number respectively.

U.S. Pat. No. 4,642,678 issued Feb. 10, 1987 to D. R. Cok shows a method for processing sampled image signals produced by a single-chip color image sensor having a checkerboard luminance sampling pattern. The patent discloses a signal processing method for producing neighboring hue values representing a hue component of the image at neighboring chrominance component sample locations as a function of a luminance value and a chrominance value at the neighboring locations, producing an interpolated hue value representing the hue component of the image at an interpolation location as a function of the neighboring hue values, and producing an interpolated chrominance value as a function of the interpolated hue value and a luminance value at the interpolating location. The signal processing method disclosed in the patent reduces color fringing in an image reproduced from the sampled image signal without introducing unwanted hue shifts. On the other hand, the patent discloses a way of generating interpolated luminance values that averages four nearest neighbors like a digital low-pass filter. Thereafter, the procedure for the interpolation of luminance values causes the decline of the frequency content of the image signal.

Moreover, U.S. Pat. No. 4,630,307 issued Dec. 16, 1986 to D. R. Cok discloses a signal processing method for providing interpolated values between sampled values in a sampled image signal produced by a single-chip color image sensor having a checkerboard luminance sampling pattern. The signal processing method disclosed in the patent is characterized by: (1) providing a plurality of different interpolation routines for producing interpolated signal values appropriate for completing a respective plurality of known geometrical image features; (2) detecting which of the known geometrical image features is represented by a neighborhood of sample values; and (3) applying the interpolation routine appropriate for completing the detected feature to the neighboring sample values to produce the interpolated signal value. In a preferred embodiment of the patent, for processing a sampled image signal from a single-chip color image sensor having a checkerboard pattern, the image features are detected in a four-sample local neighborhood. The features include an edge, a stripe, and a corner.

When the image features are detected correctly, the signal processing method disclosed in the patent can provide the interpolated signal value without errors. However, it is difficult to perform detection stably when the image signal includes large noise.

As is well known, interpolated values are generated by performing an inverse discrete cosine transform (IDCT) using a block of frequency coefficients obtained by performing a discrete cosine transform (DCT) to the blocks of original sampled values, decreasing the sampling interval from that of original sampling locations. In this case, since the inverse discrete cosine transform uses the block of frequency coefficients transformed from the original sampling values, the frequency content of the image signal is not affected by the interpolated values.

The outline of the interpolation method performing a discrete cosine transform and an inverse discrete cosine transform is explained using FIGS. 2, 3, and 4.

FIG. 2 shows locations of the original pixels in one block of 8-by-8 pixels used in a discrete cosine transform. The number "i" which shows horizontal location is zero to 7 from a left end to a right end, and the number "j" which shows perpendicular location is zero to 7 from the topmost part to the lowermost part. Here, x(i, j) is defined as the signal of the pixel located at horizontal location i and vertical location j, and F(u, v) is defined as the frequency coefficient obtained by a discrete cosine transform for horizontal frequency u and vertical frequency v, it is known that F(u, v) is given by formula 1 shown in FIG. 10, where N is the number of original pixels in a column (or a row) of a block, being 8 in FIG. 2.

According to formula 1, the value u or v can vary from zero to 7. Since the value of cosine term of F(u, V) does not change by the pixel location when u=0 (or v=0), u=0 (or v=0) means a direct current of frequency zero. The value of cosine term of F(u, v) varies from cos(PI/16) to cos(15PI/16)

between i=0 and i=7 when u=1, where "PI" is defined as pi. Since that variation range corresponds to a phase change of pi exactly at the interval of one block, u=1 (or v=1) means frequency fs/16, where fs is the frequency correspond to the reciprocal of a pixel interval. Since the frequency corresponds to u=7 is 7 times the frequency corresponds to u=1, the maximum frequency which u (or v) takes in F(u, v) is 7fs/16. Consequently, the locations where F(u, v) is defined in the frequency domain are shown by white points in FIG. 3. In FIG. 3, the horizontal frequency u is expressed on a horizontal axis, the vertical frequency v is expressed on a perpendicular axis. The white points express not the values but the locations of the frequency coefficients.

Similarly, the resulting block of 8-by-8 frequency coefficients is transformed back to the spatial domain by use of an inverse discrete cosine transform given by formula 2 shown in FIG. 11.

For understanding the mathematical basis of interpolation, it is important to note that, upon replacing the integer variable, 2i and 2j, by integer i' and j' respectively, such that i' (or j')=0 to 15, there is obtained the relationship for the inverse discrete cosine transform given by formula 3 shown in FIG. 12, wherein x'(i',j') is an interpolated signal function. The pixel location of x'(i', j') generated by formula 3 is as being shown in FIG. 4. Since i' is replaced by 2i, the signal x'(i',0) corresponds to the pixel location i'=0 (, 2, 4, 6, 8, . . . , or 14) is equivalent to the signal x(i,0) corresponds to the pixel location i=0 (, 1, 2, 3, 4, . . . , or 7). Similarly, the signal x'(0,j') corresponds to the pixel location j'=0 (, 2, 4, 6, 8, . . . , or 14) is equivalent to the signal x(0,j) corresponds to the pixel location j=0 (, 1, 2, 3, 4, . . . , or 7). That is, each pixel location shown in FIG. 4 with a white point is equivalent to the original pixel location shown in FIG. 2. On the other hand, each pixel location shown in FIG. 4 with black point is the additional pixel location. Since the frequency coefficients generated from the block of original pixels are used for reproduction of the interpolated values, the interpolated signal can be provided without affecting the frequency content of the image signal.

For example, U.S. Pat. No. 5,168,375 issued Dec. 1, 1992 to M. L. Reisch and M. A. Wober discloses a method for processing a field of image data samples to provide for one or more of the functions of decimation, interpolation, and sharpening that is accomplished by use of an array transform processor such as that employed in a JPEG compression system.

However, since the zero values in a block of pixels produced by the luminance signal of checkerboard pattern are represented by an inverse discrete cosine transform as zero, there is no example in which a discrete cosine transform is applied only to the original sampled values of the luminance signal.

BRIEF SUMMARY OF THE INVENTION

It is the object of the present invention to provide a signal processing method for producing interpolated signal values between sampled signal values in a sampled image signal generated by a checkerboard sampling pattern without affecting the frequency content of the image signal and without detection of image features.

The object of the invention is achieved by employing a signal processing method that comprises a procedure for extracting a block of 2N-by-2N signal values that correspond to a block of sampling locations of the checkerboard sampling pattern, where N is integer. Here, the block of sampling locations is surrounded by the Nth sampling location toward the upper direction of a interpolation location, the Nth sampling location toward the right direction of the interpolation location, the Nth sampling location toward the left direction of the interpolation location, and the Nth sampling location toward the lower direction of the interpolation location. Whereby, a block of 2N-by-2N signal values is extracted so that sampled signal values exist in all the pixel locations of the block. The signal processing method also comprises a procedure for providing a set of frequency coefficients by a discrete cosine transform with the block of 2N-by-2N sampled signal values, and a procedure for providing at least a interpolated signal value that corresponds to the interpolation location by an inverse discrete cosine transform with the set of frequency coefficients.

BRIEF DESCRIPTION OF THE SEVERAL VIEWS OF THE DRAWING

The aforementioned aspects and other features of the invention are explained in the following description, taken in connection with the accompanying drawing wherein:

FIG. 10 shows formula 1;
FIG. 11 shows formula 2;
FIG. 12 shows formula 3;
FIG. 13 shows formula 4;
FIG. 14 shows formula 5;
FIG. 15 shows formula 6;
FIG. 16 shows formula 7; and
FIG. 17 shows formula 8.

DETAILED DESCRIPTION OF THE INVENTION

Figures 1, 2:
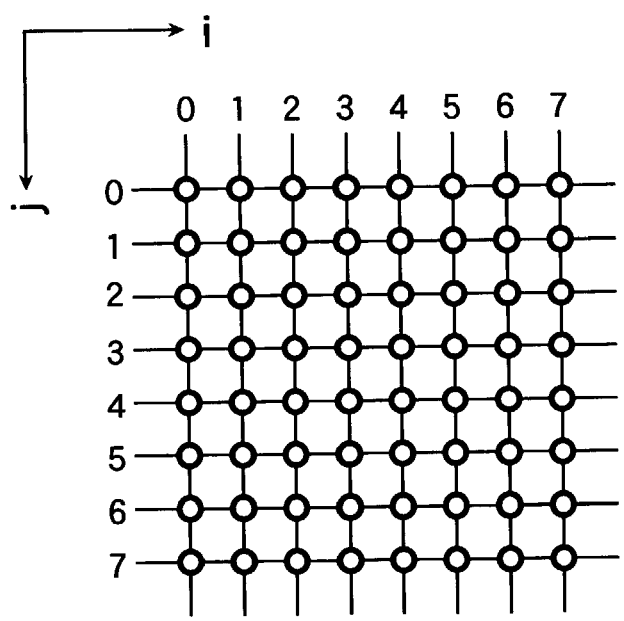
FIG. 1 is a schematic diagram of a single-chip color image sensor having a checkerboard luminance sampling pattern.
FIG. 2 shows a block of 8-by-8 pixels used for explanation of a conventional discrete cosine transform.
Figure 3:
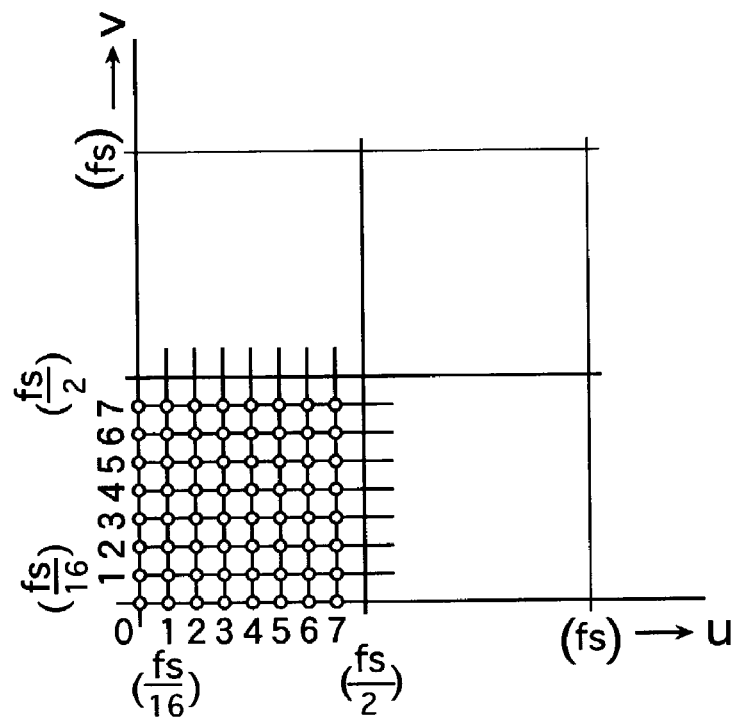
FIG. 3 shows locations of 8-by-8 frequency coefficients generated using a conventional discrete cosine transform in the frequency domain.
Figure 4:
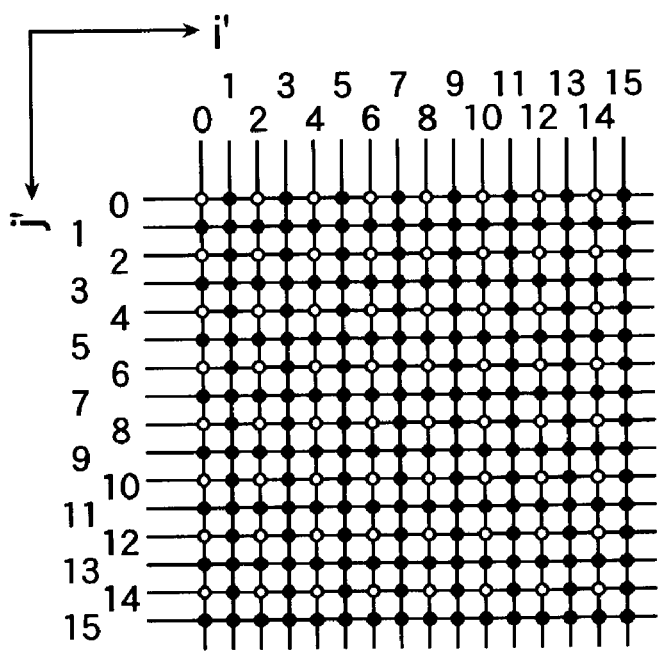
FIG. 4 shows a block of 16-by-16 pixels generated by a conventional inverse discrete cosine transform, decreasing the sampling interval from that of original sampling locations.
Figure 5:
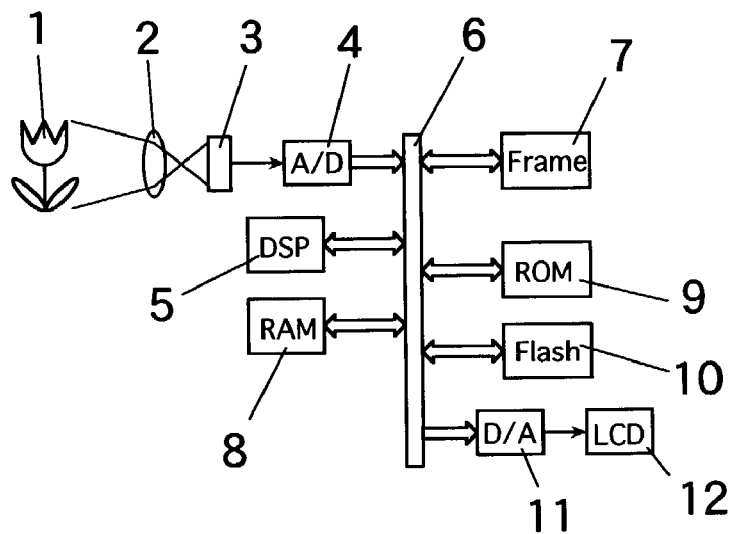
FIG. 5 is a schematic diagram showing apparatus for generating, processing, displaying, and storing a sampled image signal.

Referring to the figures, exemplary embodiments of the invention will now be described. An example of the apparatus with which the invention is applied is shown in FIG. 5. The apparatus includes an optical system having a lens 2 for forming an image of object 1 on a single-chip color image sensor 3. The single-chip color image sensor 3, such as a two dimensional CCD transfer image sensor, overlaid with the Bayer array shown in FIG. 1, produces a sampled analog signal. The sampled analog signal is supplied to an analog-to-digital converter 4 and converted to a digital signal. The digital signal is supplied to a digital signal processor 5 through a data bus 6. The digital signal processor 5 performs the signal processing according to the present invention to interpolate luminance values between the luminance samples of the signal. The digital signal processor 5 is connected through the data bus 6 with a frame memory 7, for storing the unprocessed image signal and the processed image signal including the interpolated sample values, random access and read only memories (RAM and ROM) 8 and 9 for storing the programs that control the digital signal processor 5, and a flash memory 10 that can be removed from apparatus for storing the represented image signal. The processed image signal stored on the frame memory 7 is supplied to a liquid crystal display 12 via a digital-to-analog converter 11.

Figure 6:
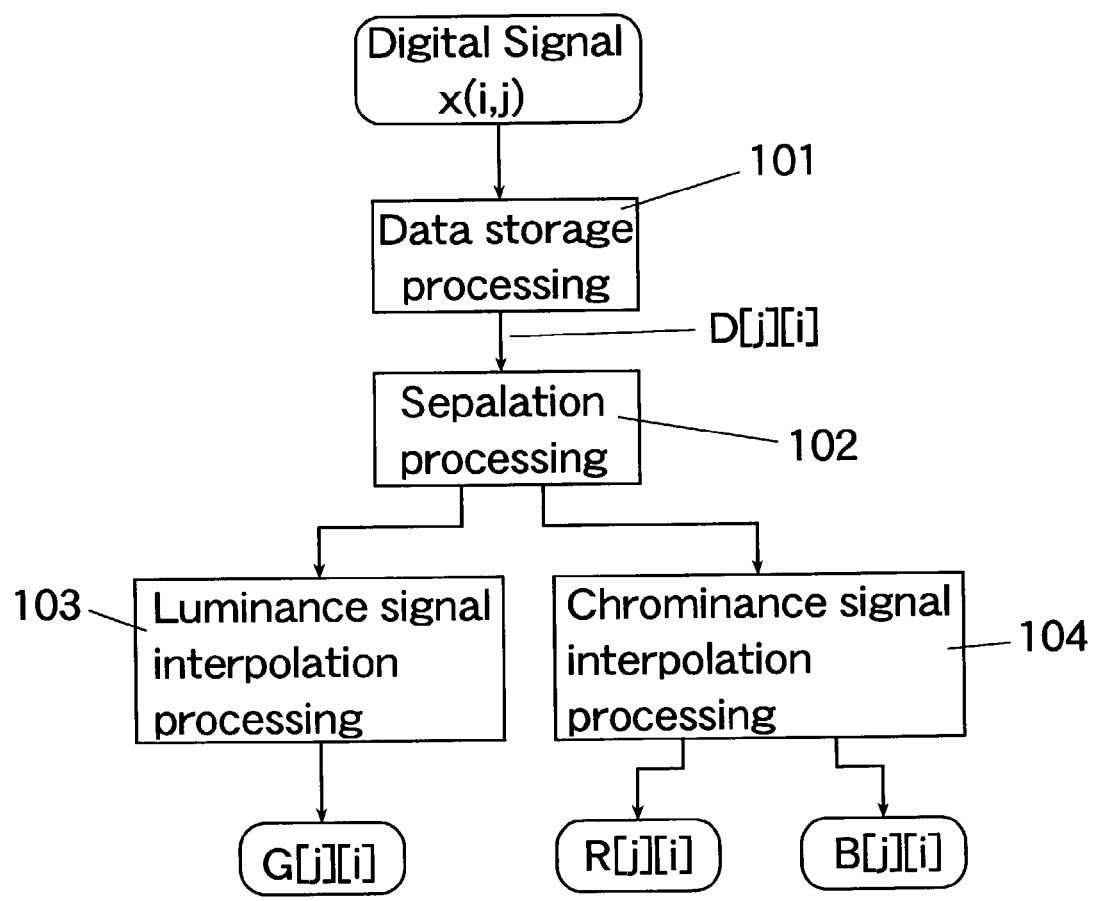
FIG. 6 is a schematic block diagram illustrating the signal processing method according to the invention.

The procedure of the digital signal processor that produces the interpolated luminance signal and the interpolated chrominance signals from the digital signal converted by the analog-to-digital converter 4 is shown in FIG. 6. The digital signal x(i,j) is stored in variable D[j][i] in the frame memory 7 by a data storage processing 101, where x(i,j) means the signal generated by the pixel located at (i,j), (i,j) meaning the location of row number "i" and column number "j" in the single-chip color image sensor 3. By next separation processing 102, variable D[j][i] is divided into the luminance signal G[j][i], the red chrominance signal R[j][i], or the blue chrominance signal B[j][i], corresponding to the sampling location of the pixel which generated it. Since it is defined in FIG. 1 that D[2n][2m] are the blue chrominance signal values, D[2n][2m+1] and D[2n+1][2m] are the luminance signal values, and D[2n+1][2m+1] are the red chrominance signal values, where m and n are integer, the procedure of the separation processing 102 can be realized by a computer program in a language C++ as

```
//   Signal separation
//      ( language: C++ )
    for (n=0;n<Vmax/2;n++) {
        for (m=0;m<Hmax/2;m++) {
            B[2n][2m]=D[2n][2m];
            G[2n][2m+1]=D[2n][2m+1];
            G[2n+1][2m]=D[2n+1][2m];
            R[2n+1][2m+1]=D[n+1][2m+1];
        }
    }
//,
``` where Vmax is the number of columns and Hmax is the number of rows of the shingle-chip color image sensor respectively.

The luminance signal G[j][i] is interpolated by a luminance signal interpolation processing 103, being provided for each sampling location. Similarly, the red chrominance signal R[j][i] and the blue chrominance signal B[j][i] are interpolated by a chrominance signal interpolation processing 104. The chrominance signal interpolation processing 104 may averages two or four nearest neighbors as a conventional procedure. The interpolated luminance signal and the interpolated chrominance signals are stored in the frame memory 7, and converted to a video signal that is applied to digital-to-analog converter 11 for displaying. Also, the interpolated luminance signal and the interpolated chrominance signals are converted to a image file that is stored in the flash memory 10.

Figure 7:
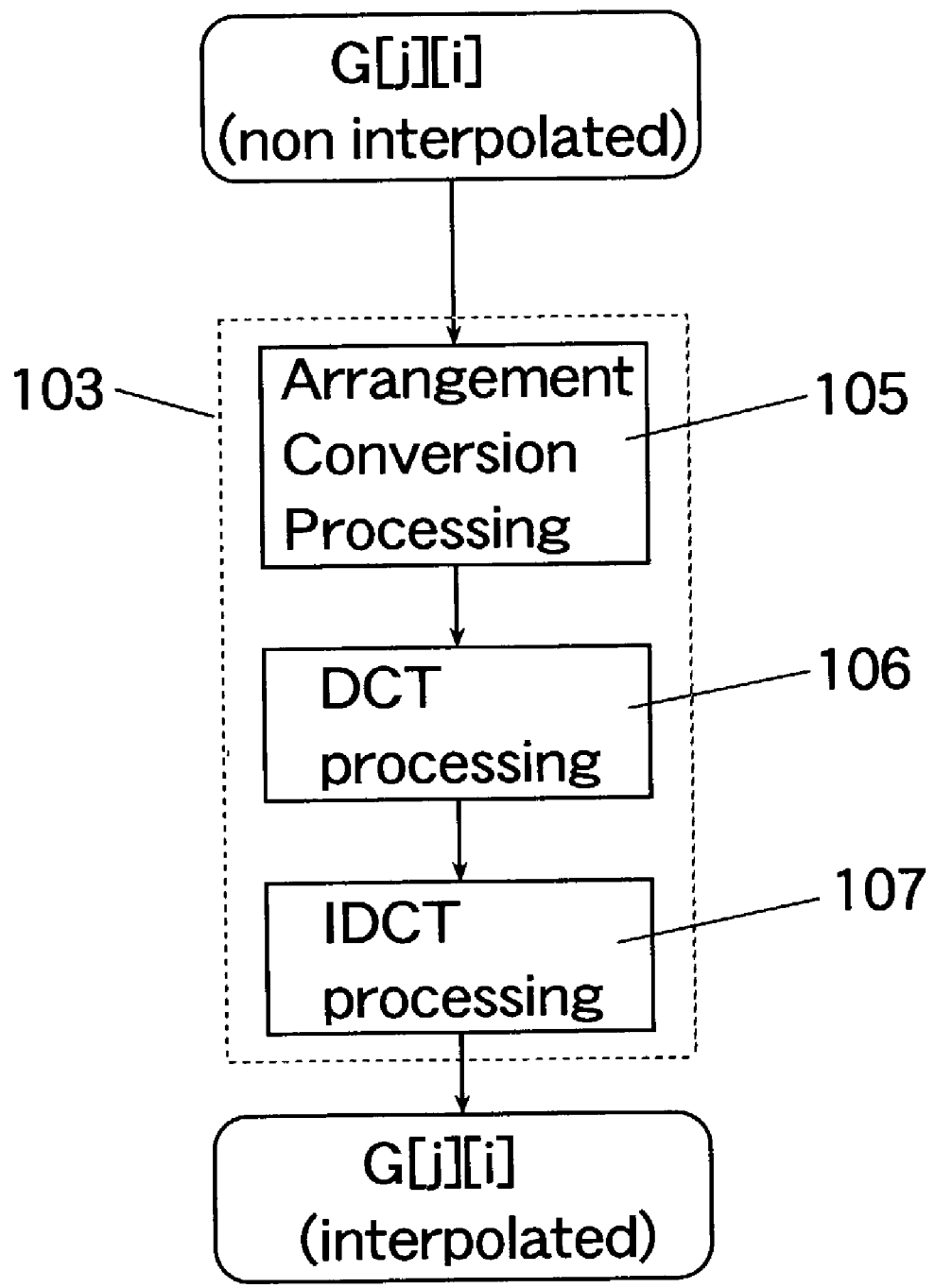
FIG. 7 is a schematic block diagram illustrating the luminance signal interpolation processing method according to the invention.

The detailed procedure of the luminance signal interpolation processing 103 is shown in FIG. 7. The luminance signal interpolation processing 103 comprises a arrangement conversion processing 105, a DCT processing 106, and an IDCT processing 107 as shown in FIG. 7. The arrangement conversion processing 105 produces an arranged array of the luminance signal Ga[k][h] from the luminance signal G[j][i]. The arrangement conversion processing 105 is aimed at forming a block of 8-by-8 pixels so that the original sampled luminance values exist in all the pixel locations of the block.

Figure 8:
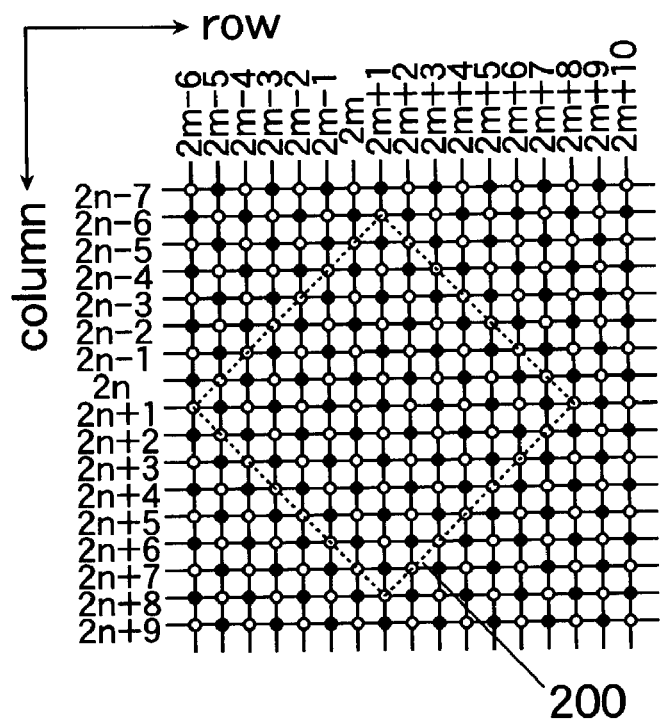
FIG. 8 shows the arrangement of pixels for luminance component of FIG. 1.

The procedure of the arrangement conversion processing 105 is explained using FIG. 8. In FIG. 8, the pixel locations of the luminance signal in the Bayer array are expressed with white dots, and the pixel locations of the red or blue chrominance signal are expressed with black dots. The object of the invention is providing the interpolated values corresponding to the pixel locations shown by the black dots in FIG. 8. For example, the procedure of the arrangement conversion processing 105 providing a luminance signal value G[2n+1][2m+1] corresponding to the location (2m+1, 2n+1) are as follows.

The luminance signal value G[2n−6][2m+1] generated by the 4th luminance pixel toward the upper direction of the pixel location (2m+1,2n+1) is replaced by an arranged luminance signal value Ga[0][0]. The luminance signal value G[2n+1][2m+8] generated by the 4th luminance pixel toward the right direction of the pixel location (2m+1,2n+1) is replaced by an arranged luminance signal value Ga[0][7]. The luminance signal value G[2n+1][2m−6] generated by the 4th luminance pixel toward the left direction of the pixel location (2m+1,2n+1) is replaced by an arranged luminance signal value Ga[7][0]. And, the luminance signal value G[2n+8][2m+1] generated by the 4th luminance pixel toward the lower direction of the pixel location (2m+1,2n+1) is replaced by an arranged luminance signal value Ga[7][7].

Similarly, the luminance signal values of G[j][i], generated by the luminance pixels that exist in the block 200 shown in FIG. 8 by dotted line surrounding four pixels mentioned above, are replaced by the arranged luminance signal values of Ga[k][h] so that h may increase to 7 from zero towards going to the location (2m+8, 2n+1) from the location (2m+1, 2n−6) and k may increase to 7 from zero towards going to the location (2m−6, 2n+1) from the location (2m+1, 2n−6). Consequently, the arranged luminance signal values of Ga[k][h] are defined to a block of 8-by-8 pixels. The procedure of the arrangement conversion processing 105 is realized by a computer program in a language C++ as

```
//   Arrangement conversion
//      ( language: C++)
    for (k+0;k<8;k++) {
        for (h=0;h<8;h++) {
            Ga[k][h]=G[(2n+1)+k+h−7][(2m+1)−k+h];
        }
    }
//.
```

In the DCT processing 106 shown in FIG. 7, a set of 8-by-8 frequency coefficients Fa(u', v') is obtained from the block of 8-by-8 pixels of the arranged luminance signal Ga[k][h], generated by the arrangement conversion processing 105, by use of a discrete cosine transform given by formula 4 shown in FIG. 13, where N is 8 in this example as shown in FIG. 8. The resulting set of 8-by-8 frequency coefficients is transformed back to the spatial domain by use of an inverse discrete cosine transform given by formula 5 shown in FIG. 14.

Replacing the integer variable, 2k and 2l, by integer k' and h' respectively, formula 5 can be rewritten by formula 6 shown in FIG. 15.

In the continuing IDCT processing 107, a signal Ga'[k'][h'] in the spatial domain is obtained from the set of 8-by-8 frequency coefficients Fa(u',v') by use of an inverse discrete cosine transform given by formula 6. Since 2k is replaced by k' and 2h is replaced by h', Ga'[6][6] corresponds to Ga[3][3] replacing G[2n][2m+1], Ga'[8][6] corresponds to Ga[4][3] replacing G[2n+1][2m], Ga'[6][8] corresponds to Ga[3][4] replacing G[2n+1][2m+2], and Ga'[8][8] corresponds to Ga[4][4] replacing G[2n+2][2m+1]. Since Ga'[7][7] calculated by putting 7 to k' and h' corresponds to the center location of these four pixels, it is apparent that Ga'[7][7] is the interpolated value G[2n+1][2m+1] which corresponds to the location (2m+1, 2n+1).

Similarly, when the interpolated value G[2n+1][2m+3] that corresponds to the location (2m+3, 2n+1) is generated, the luminance signal G[2n−6][2m+3] generated by the pixel of (2m+3, 2n−6), the luminance signal G[2n+1][2m+10] generated by the pixel of (2m+10, 2n+1), the luminance signal G[2n+1][2m−4] generated by the pixel of (2m−4, 2n+1), and the luminance signal G[2n+8][2m+3] generated by the pixel of (2m+3, 2n+8) are selected as a top of the block in the arrangement conversion processing 105. Thereafter, the luminance values of G[2n][2m] and G[2n+1][2m+1] are interpolated by the luminance signal interpolation processing 104 for all of n and m. Therefore, the luminance signal G[j][i] is provided for every sampling location of the pixel in the single-chip color image sensor.

In above example, although only the interpolated value that corresponds to the center of a block was generated using one set of frequency coefficients, interpolated values correspond to other locations in the block can be generated simultaneously. When Ga'[7][5] is generated by the IDCT processing 107 using the frequency coefficients transformed with the luminance pixels in the block 200 shown in FIG. 8, the interpolated value that corresponds to the location (2m, 2n) will be acquired. Similarly, if the inverse discrete cosine transform processing is performed with h' and k' that are both odd number, the luminance values that correspond to the pixel locations shown by the black dots within the block 200 in FIG. 8 are acquired. If plural interpolated values are generated using a set of frequency coefficients obtained by one discrete cosine transform processing, the synthetic amount of calculations can be reduced. However, the interpolated values that correspond to the locations near the circumference of the block may have some error in connection with a lack of the relation with the pixel that exists outside of the block.

When only the interpolated value that corresponds to the center location of a block is generated using one set of frequency coefficients, calculations for u of odd number or v of odd number are not required in the discrete cosine transform processing. Putting 7 to k' and h' that corresponds to the center location of the block causes the cosine term in formula 6 to be zero with u of odd number or v of odd number. In this case, the procedure of the IDCT processing 107 may be given by formula 7 shown in FIG. 16.

Since the DCT processing 106 should calculate Fa(u', v') only to u' of even number and v' of even number, and the IDCT processing 107 is simplified, the amount of calculations required for generation of the interpolated values can be reduced.

Furthermore, since Fa (u', v') is linear combination of each arranged luminance signal Ga[k][h] as shown in formula 4, the interpolated signal value corresponding to the center of a block becomes linear combination of each arranged luminance signal Ga[k][h]. Consequently, formula 7 can be rewritten by formula 8 shown in FIG. 17. Obtaining the coefficient coef(k, h) in formula 8 for all k and h, the generation of the interpolated signal value by DCT and IDCT corresponding to the pixel position of the center of a block can be attained by the two dimensional matrix operation using coefficients coef(k, h).

Figure 9:
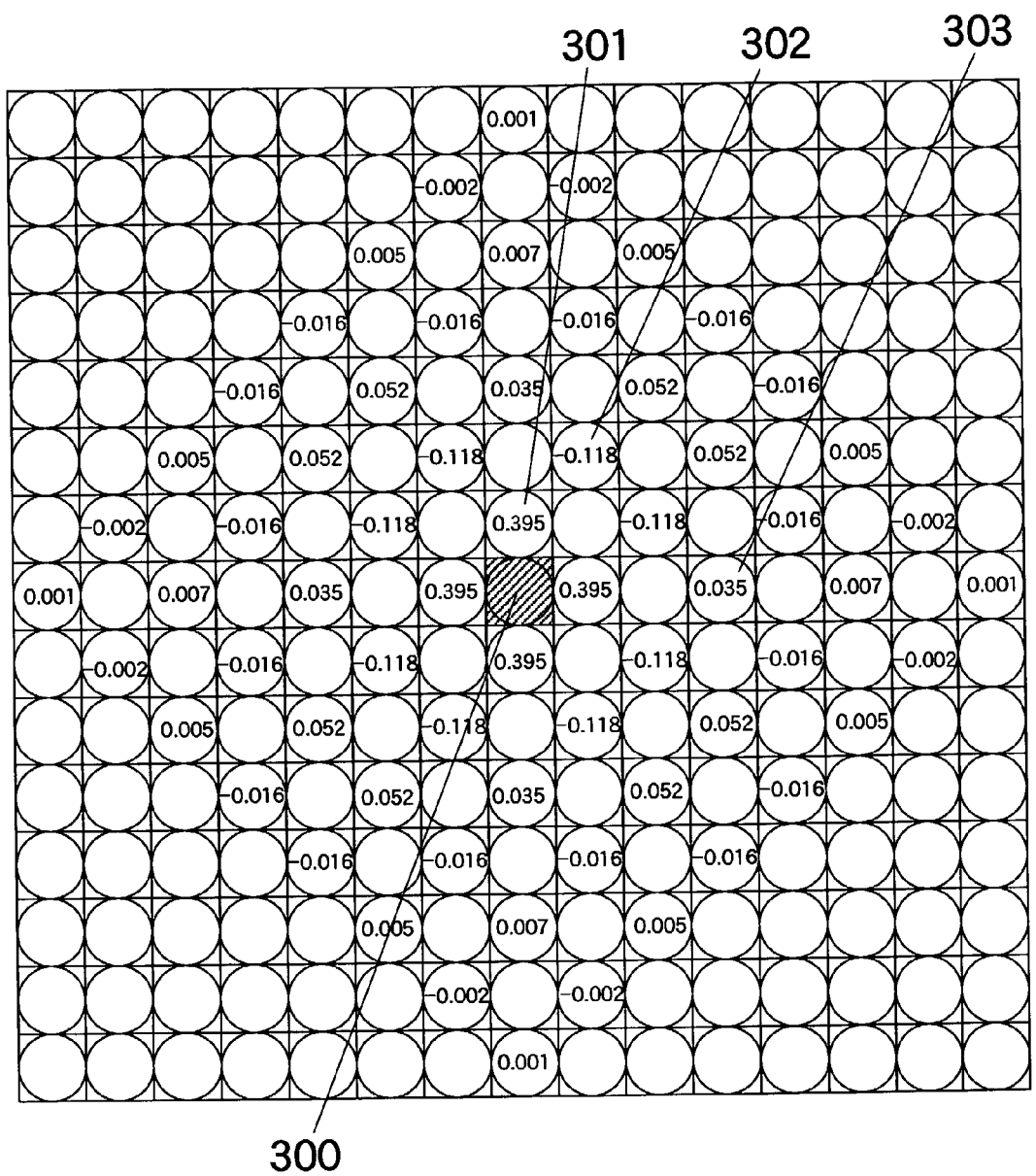
FIG. 9 is exemplary set of coefficients that attain a production of interpolated signal value corresponding to the center location of the block of 8-by-8 pixels by the two dimensional matrix operation.

Generating the signal value Ga'[7][ ]7] in case Ga[0][0] is 1 and other pixel signal values are zero using formula 4 and formula 6, the value of coef(0, 0) is obtained. Similarly, coef(k, h) can be obtained by generating the signal value of Ga'[7][7] in case Ga[k][h] is 1 and other pixel signal values are zero using formula 4 and formula 6. An example of the values of the computed coefficients is shown in FIG. 9. FIG. 9 expresses values of the coefficients which obtained for N as 8 in formula 4 and formula 6. In order to generate the interpolated signal value corresponding to a pixel 300, the signal value of a pixel 301 is added being multiplied by 0.395, the signal value of a pixel 302 is subtracted being multiplied by 0.118, the signal value of a pixel 303 is added being multiplied by 0.035, and etc. In this way, the interpolated signal value based on processing of DCT and IDCT corresponding to the center of a block can be generated by the easy operation compared with processing of DCT and IDCT.

Although the DCT processing 106 and the IDCT processing 107 that transform blocks of 8-by-8 values are used in above explanation, it is apparent to one skilled in the art that a DCT processing and an IDCT processing that transform blocks of other number, such as 16-by-16 or 4-by-4, can be used. When blocks of 16-by-16 values are transformed, the highest frequency component obtained by the DCT processing becomes $15/32$ time the frequency decided at intervals of a pixel, and approaches the Nyquist frequency. Then, the amount of calculations for the DCT processing and the IDCT processing becomes large. Moreover, when blocks of 4-by-4 values are transformed, the amount of calculations for the DCT processing and the IDCT processing becomes small. Then, the highest frequency component obtained by the DCT processing will be $3/8$ time the frequency decided at intervals of a pixel, and keeps away from the Nyquist frequency.

The exemplary embodiments are provided to illustrate aspects of the invention and should not be construed as limiting the scope of the invention. Although the elements of the apparatus are shown physically connected by bus 6 in FIG. 5, the elements may be separated and the signals carried between the elements by storage media. For example, the digital signal converted by the analog-to-digital converter 4 may be recorded directly on the flash memory 10 and supplied to a personal computer, not described, for signal processing.

In addition, the main point of the invention is to change the axis of blocks of 8-by-8 pixels so that each pixel of the block corresponds to the luminance pixel arranged in the checkerboard pattern. Therefore, although the arrangement conversion processing 105 and the DCT processing 106 are divided in FIG. 7, it is clear that it is not necessary to divide an arrangement conversion processing and a DCT processing.

Although the invention has been described with reference to a preferred embodiment where the interpolated value was generated in the missing pixel location to the luminance signal of the checkerboard pattern of the single-chip color image sensor, the invention can be applied to generating the interpolated values in repeating interlaid sampling pattern.

Furthermore, although the invention has been described as being realized by software using a digital signal processor, since it is possible to transpose a software processing to a hardware processing, it is apparent to one skilled in the art that the invention can be realizable by hardware.

I claim:

1. A signal processing method for producing interpolated signal values between sampled signal values in a sampled image signal produced by a checkerboard sampling pattern comprising:

defining at least one interpolation location between said sampled signal values;

extracting a block of 2N-by-2N signal values from said sampled signal values that corresponds to a block of sampling locations of said checkerboard sampling pattern, said block of sampling locations being surrounded by the Nth sampling location toward the upper direction from said interpolation location, the Nth sampling location toward the right direction from said interpolation location, the Nth sampling location toward the left direction from said interpolation location, and the Nth sampling location toward the lower direction from said interpolation location, where N is integer;

producing a set of frequency coefficients by a discrete cosine transform with said block of 2N-by-2N signal values;

producing at least one interpolated signal value that corresponds to a center location of said block of 2Nby-2N signal values by an inverse discrete cosine transform with said set of frequency coefficients, said inverse discrete cosine transform producing signal values between adjacent signal values of said block of 2N-by-2N signal values by decreasing an interval for reproduction of signal values; and applying said interpolated signal value to said sampled image signal as a signal value corresponding to said interpolation location.

2. A signal processing method according to claim 1 wherein said sampled image signal is a luminance signal of a single-chip color image sensor overlaid with a Bayer array.

3. A signal processing method according to claim 2 wherein said luminance signal is a green signal that is sensitive in the green region of the spectrum.

4. A signal processing method according to claim 1 wherein N is 4.

5. A signal processing method for producing interpolated signal values between sampled signal values in a sampled image signal produced by a checkerboard sampling pattern comprising:

defining at least one interpolation location between said sampled signal values;

extracting a block of 2N-by-2N signal values from said sampled signal values that corresponds to a block of sampling locations of said checkerboard sampling pattern, said block of sampling locations being surrounded by the Nth sampling location toward the upper direction from said interpolation location, the Nth sampling location toward the right direction from said interpolation location, the Nth sampling location toward the left direction from said interpolation location, and the Nth sampling location toward the lower direction from said interpolation location, where N is integer;

providing a set of 2N-by-2N coefficients, each coefficient of said set of 2N-by-2N coefficients corresponding to each matrix dot of said block of 2N-by-2N signal values respectively;

producing an interpolated signal value by integrating all of signal values of said block of 2N-by-2N signal values, each signal value of said block of 2N-by-2N signal values being multiplied by each coefficient at corresponding matrix dot of said set of 2N-by-2N coefficients;

applying said interpolated signal value to said sampled image signal as a signal value corresponding to said interpolation location;

and wherein said providing a set of 2N-by-2N coefficients includes:

defining a block of 2N-by-2N impulse signal values, said block of 2N-by-2N impulse signal values comprising a signal value one at a predetermined matrix dot and signal values zero at other matrix dots, said predetermined matrix dot being chosen from matrix dots of said block of 2N-by-2N impulse signal values in turn;

producing a set of frequency coefficients by a discrete cosine transform with said block of 2N-by-2N impulse signal values;

producing a represented signal value for a center location of said block of 2N-by-2N impulse signal values by an inverse discrete cosine transform with said set of frequency coefficients, said inverse discrete cosine transform representing signal values between adjacent signal values of said block of 2N-by-2N impulse signal values by decreasing an interval for reproduction of signal values; and applying said represented signal value to said set of 2N-by2N coefficients as a coefficient at a matrix dot corresponds to said predetermined matrix dot of said block of 2N-by-2N impulse signal values.

6. A signal processing method according to claim 5 wherein said sampled image signal is a luminance signal of a singlechip color image sensor overlaid with a Bayer array.

7. A signal processing method according to claim 6 wherein said luminance signal is a green signal that is sensitive in the green region of the spectrum.

8. A signal processing method according to claim 5 wherein N is 4.

* * * * *